(12) United States Patent
Imamura

(10) Patent No.: US 7,145,533 B2
(45) Date of Patent: Dec. 5, 2006

(54) ELECTRO-OPTICAL DEVICE, METHOD OF CHECKING THE SAME, AND ELECTRONIC APPARATUS

(75) Inventor: Yoichi Imamura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

(21) Appl. No.: 11/103,531

(22) Filed: Apr. 12, 2005

(65) Prior Publication Data

US 2005/0258769 A1 Nov. 24, 2005

(30) Foreign Application Priority Data

May 20, 2004 (JP) ............................. 2004-150462

(51) Int. Cl.
*G09G 3/30* (2006.01)
*G09G 3/32* (2006.01)
(52) U.S. Cl. .......................................... 345/81; 345/82
(58) Field of Classification Search ................ 345/81, 345/82, 55, 76, 84, 92; 315/169.1, 169.3
See application file for complete search history.

(56) References Cited

U.S. PATENT DOCUMENTS 6,980,243 B1 * 12/2005 Miyawaki et al. .......... 348/302
6,995,741 B1 * 2/2006 Ishiyama .................... 345/100
2004/0263445 A1 * 12/2004 Inukai et al. ................. 345/82
2006/0007208 A1 * 1/2006 Aoki ........................... 345/204

FOREIGN PATENT DOCUMENTS

JP    A 11-167123    6/1999

* cited by examiner

*Primary Examiner*—Shih-Chao Chen
*Assistant Examiner*—Minh Dieu A
(74) *Attorney, Agent, or Firm*—Oliff & Berridge, PLC

(57) ABSTRACT

To effectively check a plurality of unit circuits, each including an electro-optical element and a control circuit. Each unit circuit U includes an OLED element and a control circuit for controlling operation of the OLED element. A check signal for tentatively driving the OLED element is input to a check terminal TPa1. A switching element is connected to a check unit circuit Ut, located at a corner of an effective region A, of the plurality of unit circuits U. The switching element is changed from an on state where the OLED element in the check unit circuit Ut is electrically isolated from the check terminal TPa1 to an off state where the OLED element in the check unit circuit Ut is electrically connected to the check terminal TPa1.

15 Claims, 7 Drawing Sheets

ELECTRO-OPTICAL DEVICE, METHOD OF CHECKING THE SAME, AND ELECTRONIC APPARATUS

BACKGROUND

The present invention relates to a technique of checking an electro-optical device using an element for converting an electrical operation into an optical operation and vice versa (hereinafter, generally referred to as an electro-optical element).

Electro-optical devices using electro-optical elements such as liquid crystals or organic light emitting diode (OLED) elements have been widely spread. For example, there has been conventionally proposed an active matrix type electro-optical device having a plurality of unit circuits (pixel circuits), which are arranged in a plane, for controlling operation of the electro-optical elements using switching elements such as thin film transistors. Such an active matrix type electro-optical device has a particular problem of errors of characteristics of the unit circuits (for example, electrical characteristics of the switching elements). To overcome this problem, for example, Patent Document 1 listed below discloses a technique of forming switching elements having the same configuration as the switching elements included in the unit circuits, separately from the unit circuits, and checking the characteristics of the unit circuits by checking their electrical characteristics.

[Patent Document 1] Japanese Unexamined Patent Application Publication No. 11-167123 (Paragraph 0019 and FIG. 1).

SUMMARY

For the electro-optical device using the liquid crystal as the electro-optical element, since characteristics of the liquid crystal itself are substantially equal over all unit circuits, presence of deviation of the characteristics for all unit circuits can be determined by checking only characteristics of the switching element. However, for the electro-optical device having the electro-optical element formed separately for each unit circuit, since there is a possibility that not only the characteristics of the switching element but also the characteristics of electro-optical element has its deviation, checking of only the characteristics of the switching element is not sufficient for the checking of all unit circuits. For example, when an OLED element, which is a kind of the electro-optical element, is formed by an inkjet method or a vacuum deposition method, although the deviation of the characteristics of OLED elements in the unit circuits occurs frequently, the technique disclosed in Patent Document 1 cannot check the characteristics of the OLED elements of the unit circuits. In addition, such a problem can similarly occur not only in the electro-optical element, such as the OLED element, for converting the electrical operation into the optical operation (for example, brightness), but also in the electro-optical device using the electro-optical element (for example, a light receiving element for outputting an electrical signal depending on the amount of reception of light) for converting the optical operation into the electrical operation. In consideration of such a problem, it is an object of the present invention to effectively check an electro-optical device having a plurality of unit circuits arranged therein, each including an electro-optical element and a control circuit for controlling the electro-optical element.

In order to achieve the above object, the present invention provides an electro-optical device comprising a plurality of unit circuits, each including an electro-optical element and a control circuit for controlling the electro-optical element; a check terminal to which a check signal for driving the electro-optical element is input; and a check signal supply element provided between an electro-optical element of a check unit circuit selected, as a check object, from the plurality of unit circuits and the check terminal, the check signal supply element having a first state where the electro-optical element in the check unit circuit is electrically isolated from the check terminal and a second state where the electro-optical element in the check unit circuit is electrically connected to the check terminal.

With this configuration, since the check signal input to the check terminal is supplied to the electro-optical element in the check unit circuit via the check signal supply element maintained under the second state, the characteristics of only the electro-optical element in the check unit circuit can be independently checked. The electro-optical element in the present invention has a concept including both an element for converting the electrical operation into the optical operation and an element for converting the optical operation into the electrical operation. The electro-optical element according to the former is, for example, an element whose optical characteristics (for example, brightness or transmittance) are changed based on a supplied electrical signal. A typical example of such an electro-optical element includes an organic electroluminescent (EL) element using a light emitting polymer or a light emitting low molecular material, however, the present invention is not limited to this. On the other hand, the electro-optical element according to latter is, for example, an element for outputting an electrical signal based on the characteristics of light incident into the electro-optical element (for example, the amount of incident light). A typical example of such an electro-optical element includes a light receiving element, such as a charge coupled device (CCD), for outputting an electrical signal based on the amount of incident light.

In a detailed aspect of the present invention, a check instruction terminal to which a check instruction signal for instructing execution of check of the electro-optical element is input is provided, and the check signal supply element is a switching element that is switched over from one of the first state and the second state to the other, based on the check instruction signal input from the check instruction terminal. According to this aspect, since the first state and the second state are properly exchanged by the check instruction terminal, an effect of the check terminal on the check unit circuit (for example, an effect of parasite capacitance in the check terminal or an effect of noise occurring in the check terminal) is suppressed by maintaining the switching element under the second state in a check mode while maintaining the switching element under the first state in a normal use state.

In another aspect, an anti-fuse changing from the first state to the second state when the anti-fuse is energized is employed as the check signal supply element. With this configuration, an effect of the check terminal on the check unit circuit can be reduced by changing the anti-fuse into the second state in a check mode while maintaining the anti-fuse under the first state for an electro-optical device having little need of checking. In addition, the anti-fuse in this aspect is preferably formed in the same process as transistors composing the control circuit in each unit circuits. In a more preferable aspect, the control circuit in each of the plurality of unit circuits includes a transistor element having a semiconductor layer and a gate electrode, the semiconductor layer being connected to a wiring line layer, and the gate electrode opposing the semiconductor layer with a gate insulating layer interposed therebetween, and the anti-fuse has a first end formed of the same material as the wiring line layer and connected to the electro-optical element of the check unit circuit, a second end formed of the same material as the wiring line layer, spaced apart from the first end, and connected to the check terminal, and an intermediate portion formed of the same material as the gate electrode and opposing the first end and the second end with the gate insulating layer interposed therebetween, the first end being electrically connected to the second end via the intermediate portion when a portion where the intermediate portion opposes the first and second ends is energized. According to this aspect, the simplification of manufacturing process and the reduction of product costs can be achieved as compared to a case where the anti-fuse is formed within a separate space.

However, errors of the characteristics of unit circuits, located at a circumferential edge, particularly, a corner, of the plurality of unit circuits arranged in a plane shape are apt to occur as compared to unit circuits at other locations. According to a preferable aspect, unit circuits, located at a circumferential edge of the effective region, of the plurality of unit circuits arranged in a plane shape and forming the effective region are selected as the check unit circuit. More preferably, unit circuits, located at a corner of the effective region, having an approximately rectangular shape, of the plurality of unit circuits are selected as the check unit circuit. According to this aspect, quality of the electro-optical device can be determined with higher precision by taking the unit circuits located at the corner of the effective region as the check object. In another aspect, dummy electro-optical elements are arranged around the effective region. Errors of the characteristics of electro-optical elements located at a circumferential edge of a region where electro-optical elements are arranged are particularly apt to occur. Under this condition, when the dummy electro-optical elements are formed around the effective region, the characteristics of the electro-optical elements in the effective region can become uniform. The dummy electro-optical elements refer to electro-optical elements that do not contribute to inherent functions of the electro-optical device (for example, an image display function or a light receiving function), regardless of whether or not concomitant control circuits are provided.

The effective region in the present invention refers to a region where unit circuits that are directly involved in the inherent functions of the electro-optical device are arranged. For example, for the electro-optical device for displaying images using electro-optical elements for converting the electrical operation into the optical operation, a region where images perceived by naked eyes of a user are actually displayed (a so-called display region) is considered as the effective region. Also, for the electro-optical device for outputting the electrical signal based on the amount of received light using electro-optical elements for converting the optical operation into the electrical operation, a region where light to be converted into an electrical signal are actually received is considered as the effective region.

In a preferable aspect of the present invention, the control circuit in each of the plurality of unit circuits has a switching element (a transistor T3 in each embodiment, which will be described later) for switching between electrical conduction and non-conduction between the electro-optical element and the control circuit. According to this aspect, since the electro-optical element can be electrically isolated from the control circuit in a check mode of the electro-optical device, an effect of the control circuit on the electro-optical element can be excluded, and accordingly, the characteristics of the electro-optical device can be checked with higher precision.

In another aspect, a wiring line interposed between the electro-optical element and the check terminal includes a plurality of first wiring lines formed spaced apart from one another, and a second wiring line, formed of a material having anti-corrosivity higher than that of the first wiring lines, for electrically connecting the plurality of first wiring lines to one another. According to this aspect, since the first wiring lines are formed spaced apart from one another, corrosion occurring in the first wiring lines at the check terminal side can be prevented from reaching the check signal supply element or the electro-optical element. In this aspect, preferably, the control circuit in each of the plurality of unit circuits includes a transistor element having a semiconductor layer and a gate electrode, the semiconductor layer being connected to a wiring line layer, and the gate electrode opposing the semiconductor layer with a gate insulating layer interposed therebetween, the plurality of first wiring lines is formed of the same material as the wiring line layer, the second wiring line is formed of the same material as the semiconductor layer. According to this aspect, the simplification of manufacturing process and the reduction of product costs can be achieved as compared to a case where the wiring lines are formed in a separate process.

In still another aspect of the present invention, the electro-optical element is an OLED element in which a plurality of layers, including a light emitting layer, are stacked between an anode and a cathode, and the electro-optical device further comprises alignment patterns formed by stacking two or more layers selected from a plurality of layers including the layers composing the OLED element, the anode and cathode. According to this aspect, by observing the alignment patterns, the relative positional relationship or the film thickness of layers of the OLED element can be measured. In still another aspect of the present invention, the electro-optical element is an OLED element having an anode, a cathode, and a plurality of layers including a light emitting layer, the plurality of layers stacked between the anode and cathode, and the electro-optical device further comprises first alignment patterns formed by stacking two or more layers selected from a plurality of layers including the layers composing the OLED element, the anode and cathode, and second alignment patterns formed by stacking two or more layers having a combination different from a combination of the layers composing the first alignment patterns. According to this aspect, by comparing a result of observation of the first alignment patterns and a result of observation of the second alignment patterns, the positional relationship of layers of the OLED element can be measured with higher precision.

The electro-optical device of the present invention is employed as a display device or a light receiving device of various electronic apparatuses. These electronic apparatuses include personal computers, mobile phones, personal digital assistants, monitors, digital cameras, view finders, etc.

The present invention provides a method of checking an electro-optical device including a plurality of unit circuits, each including an electro-optical element and a control circuit for controlling the electro-optical element, wherein, after changing a check signal supply element provided between a check unit circuit selected, as a check object, from the plurality of unit circuits and a check terminal, from a first state where the electro-optical element in the check unit circuit is electrically isolated from the check terminal to a second state where the electro-optical element in the check unit circuit is electrically connected to the check terminal, a check signal for driving the electro-optical element is input to the check terminal, and a change of the state of the electro-optical element when the check signal is input to the check terminal is checked. According to this method, the same effect as the electro-optical device according to the present invention can be achieved. In addition, in the configuration that the control circuit in each of the plurality of unit circuits has a switching element for switching between electrical conduction and non-conduction between the electro-optical element and the control circuit, when the check signal is input to the check terminal, the electro-optical element is electrically isolated from the control circuit by turning off the switching element. Accordingly, an effect of the control circuit on the electro-optical element can be excluded and the characteristics of only the electro-optical element can be independently checked.

DETAILED DESCRIPTION OF EMBODIMENTS

1. First Embodiment

Figure 1:
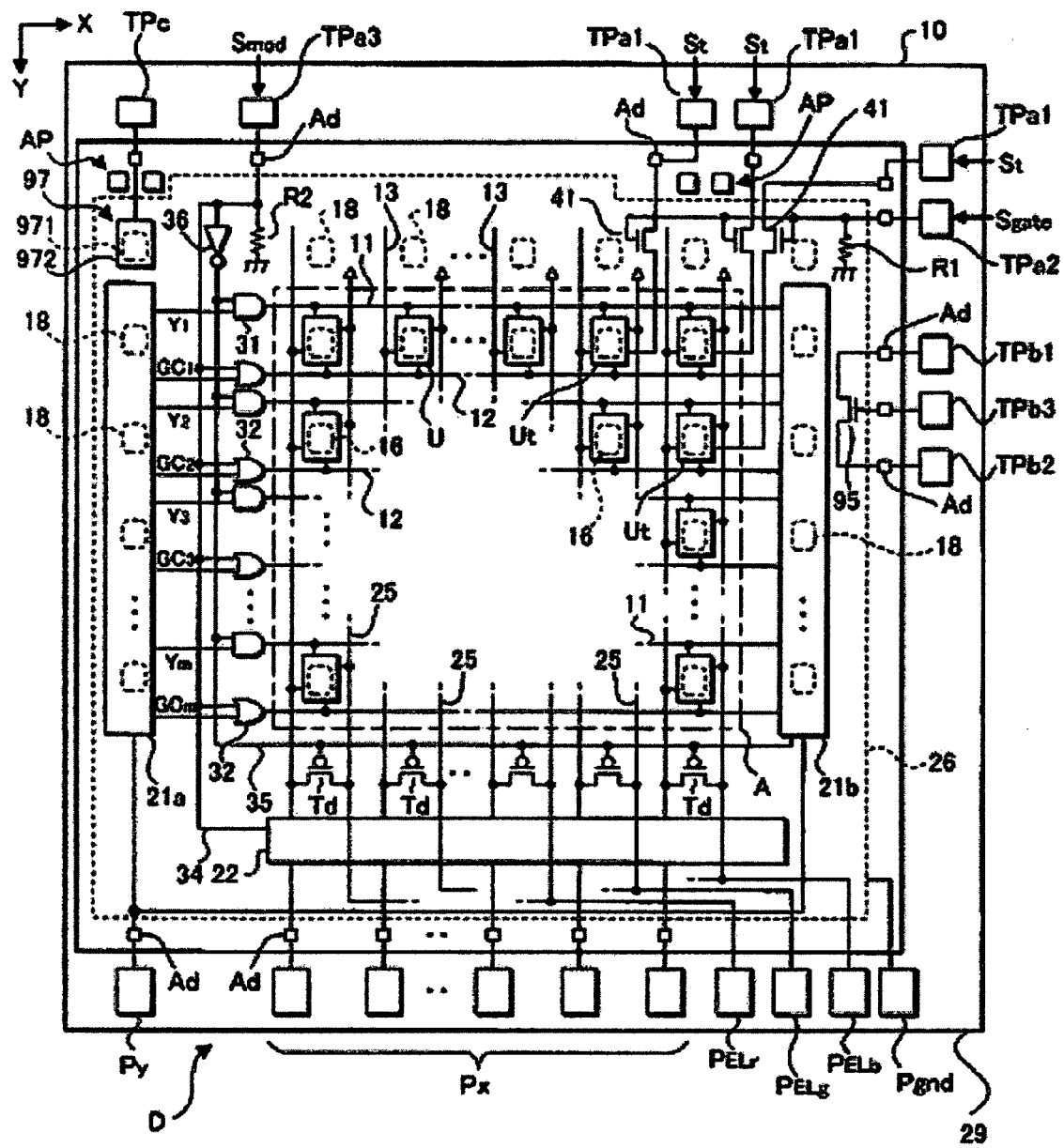
FIG. 1 is a block diagram illustrating a configuration of an electro-optical device according to a first embodiment of the present invention.

To begin with, an application of the present invention to an electro-optical device using OLED elements as electro-optical elements will be described. FIG. 1 is a block diagram of the electro-optical device. As shown in the figure, an electro-optical device D has a substrate 10. The substrate is a substantially rectangular plate member formed of material having light transmittance, such as glass or plastic. Elements shown in FIG. 1 are formed on the surface of the substrate 10. A sealing plate 29 is bonded to the surface of the substrate 10 on which the elements are formed. The sealing plate 29 is a plate member having an external dimension smaller than the substrate 10. A plurality of connecting terminals (Py, Px, TPa1, TPa2, . . . ) is formed along a margin of the substrate 10 on a region of the substrate 10, which projects from the circumference of the sealing plate. These connecting terminals are used for input of electrical signals to the electro-optical device D or output of electrical signals from the electro-optical device D, which will be described in detail later.

On the surface of the substrate 10 are formed m scan lines 11 extending in the X direction (shown in the figure), m light emission control lines 12 extending the X direction, with respective scan lines 11 paired, and n data lines 13 extending in the Y direction perpendicular to the X direction (m and n are an integer). Unit circuits U functioning as pixels are arranged at intersections of pairs of scan lines 11 and light emission control lines 12 and the data lines 13, respectively. In this way, the electro-optical device D according to this embodiment is an active matrix type display device having the unit circuits U arranged in the form of an m×n matrix along the X and Y directions. Hereinafter, a region A of a substantially rectangular shape in which the units U are arranged is referred to as an effective region. The effective region A is a region where images to be visually perceived by users are actually displayed.

The unit circuits U have respective OLED elements 16 emitting light with brightness varied depending on supplied electrical signals. In the case of a full color display device, each of the unit circuits U is allocated with one of red, green and blue colors, and the OLED element 16 of the unit circuit U emits light having a wavelength corresponding to a color allocated to the unit circuit U. Unit circuits U corresponding to the red color are connected to a connecting terminal PELr via power lines 25, unit circuits U corresponding to the green color are connected to a connecting terminal PELg via power lines 25, and unit circuits U corresponding to the blue color are connected to a connecting terminal PELb via power lines 25. A source voltage VEL independently predetermined for each color is applied to each connecting terminal PELr, PELg and PELb.

In addition, as shown in FIG. 1, a plurality of dummy elements 18 is formed in the vicinity of the effective region A. The dummy elements 18 are arranged with the approximately same interval as the unit circuits U along the X and Y directions, and are OLED elements formed of the same material as the OLED elements 16 of the unit circuits U in a common process. But, since the dummy elements 18 are not electrically connected to other elements such as the scan lines 11 or the data lines 13, they do not contribute to display of the images. The above-mentioned effective region A may be considered as a region where the plurality of OLED elements is arranged, except a region where the dummy elements 18 are arranged.

Here, an operation mode of the electro-optical device D of this embodiment includes a mode in which the characteristic of the unit circuits U are checked (hereinafter, referred to as a check mode), in addition to a mode in which images are displayed in the effective region A, as an intrinsic function of the display device, (hereinafter, referred to as a normal display mode). In the check mode, unit circuits pre-selected from the plurality of unit circuits U (hereinafter, particularly referred also to as check unit circuits Ut) are the object of check. By checking quality of the characteristics of these check unit circuits Ut, quality of the characteristics of other unit circuits U is estimated. In this embodiment, three unit circuits U, arranged at a corner in the right top portion of the effective region A, of the plurality of unit circuits U, i.e., three unit circuits U located at an (n−1)-th column in a first row, an n-th column in the first row, and an n-th column in a second row, respectively, are chosen as the check unit circuits.

As shown in FIG. 1, the check unit circuits Ut are connected to respective connecting terminals TPa1 via switching elements 41 arranged corresponding to the check unit circuits Ut (hereinafter, particularly referred to as check terminals). The switching elements 41 in this embodiment are an n-channel transistor. Check signals St for tentatively driving the OLED elements 16 in the checking operation are input to the check terminals TPa1 to which drain electrodes of the switching elements 41 are connected. In addition, gate electrodes of the switching elements 41 are connected in common to a connecting terminal TPa2 to which a check instruction signal Sgate for instructing checking of the OLED elements 16 is input (hereinafter, particularly referred to as a check instruction terminal). On the other hand, the switching elements 41 are not connected to unit circuits U except the check unit circuits Ut. In addition, in the following description, the unit circuits U means any unit circuits including the check unit circuits Ut.

Figure 2:
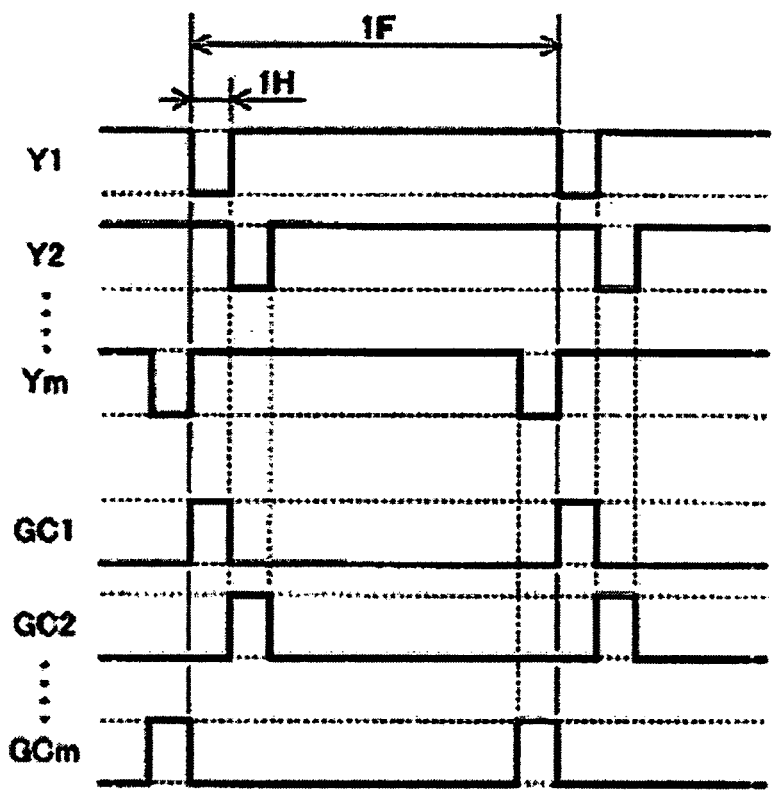
FIG. 2 is a timing chart illustrating operation of scan line driving circuits of the electro-optical device according to the first embodiment of the present invention.

Scan line driving circuits 21 (21*a* and 21*b*) and a data line driving circuit 22 are arranged in the vicinity of the effective region A. Each scan line 11 has one end (an end portion in the left in FIG. 1) connected to the scan line driving circuit 21*a* via an AND gate 31 and the other end (an end portion in the right in FIG. 1) connected to the scan line driving circuit 21*b*. In addition, each light emission control line 12 has one end connected to the scan line driving circuit 21*a* via an OR gate 32 and the other end connected to the scan line driving circuit 21*b*. Output of the scan line driving circuit 21*b* is controlled by an inverted signal of a check mode signal Smod. The output of the scan line driving circuit is floated when this inverted signal has an L level, and controls the scan lines 11 and the light emission control lines 12 in synchronization with output of the scan line driving circuit 21*a* when this inverted signal has an H level. Each scan line driving circuit 21 (21*a* and 21*b*) include a shift register of m bits corresponding to the total number of the scan lines 11 or light emission control lines 12. When the normal display mode is selected, each scan line driving circuit 21 outputs the scan signals Y1, Y2, . . . , Ym, which go in an active level (L level in this embodiment) sequentially for each horizontal scanning period (1H) dividing each vertical scanning period (1F), sequentially from respective output terminals, based on control signals (for example, clock signals) supplied via the connecting terminal Py, as shown in FIG. 2. In addition, each scan line driving circuit 21 outputs light emission control signals GC1, GC2, . . . , GCm of inverted logic level of the scan signals Y1, Y2, . . . , Ym sequentially from respective output terminals. Accordingly, as shown in FIG. 2, a light emission control signal GCi supplied to a light emission control line 12 in an i-th row goes in an H level for an i-th horizontal scanning period and maintains an L level for periods other than the i-th horizontal scanning period. In addition, although the configuration that the scan line driving circuits 21*a* and 21*b* are arranged at both sides of the scan lines 11 and the light emission control lines 12 has been exemplified here, a configuration that the scan line driving circuit 21 is arranged at only one side of the scan lines 11 or the light emission control lines 12 may be employed as long as bluntness or delay of a waveform of a scan signal Yi or the light emission control signal GCi and voltage drop of the light emission control signal GCi do not cause a problem.

The check mode signal Smod for indicating contents of check for the check unit circuits Ut is input to a connecting terminal (hereinafter, referred to as a check mode terminal) as shown in FIG. 1. The check mode signal Smod has one of H and L levels depending on the contents of check for the check mode, while maintaining at an L level for the normal display mode. An OR gate 32 in an i-th row when counted from top in FIG. 1 has one input terminal connected to an output terminal of the light emission control signal GCi from the scan line driving circuit 21 and the other input terminal connected to a wiring line 34 connected to the check mode terminal TPa3. Accordingly, for the normal display mode in which the check mode signal Smod is maintained at the L level, each light emission control signal GCi output from the scan line driving circuit 21*a* is supplied to a light emission control line 12 in an i-th row via the OR gate 32. In addition, a pull-down resistor R2 and an input terminal of an inverter 36 are connected to the wiring line 34. An AND gate 31 in an i-th row when counted from top in FIG. 1 has one input terminal connected to an output terminal of the scan signal Yi from the scan line driving circuit 21 and the other input terminal connected to a wiring line 35 connected to an output terminal of the inverter 36. Accordingly, for the normal display mode in which the check mode signal Smod is maintained at the L level, each scan signal Yi output from the scan line driving circuit 21 is supplied to a scan line 11 in an i-th row via the AND gate 31. If the scan signal Yi has an active level, it shows that the scan line 11 at the i-th row is selected.

On the other hand, the data lines 13 have one ends connected to the data line driving circuit 22. The data line driving circuit 22 supplies data signals D1, D2, . . . , Dn, which correspond to image data supplied from each of n connecting terminals Px corresponding to the total number of the data lines 13, to respective data lines 13. For example, for the normal display mode, the data line driving circuit 22 outputs the data signals D1, D2, . . . , Dn corresponding to the image data to unit circuits U in one row (the total number of n) corresponding to scan lines 11 selected by each scan line driving circuit 21. The image data is data for indicating brightness (gray scale) of the OLED elements 16 in the unit circuits U.

P-channel transistors (hereinafter, referred to as data voltage control transistors) Td are interposed between data lines 13 and adjacent power lines 25, respectively. Gate electrodes of the data voltage control transistors Td are connected to the above-mentioned wiring line 35. For the normal display mode in which the check mode signal Smod is maintained at the L level, since all data voltage control transistors Td are turned off, the data lines 13 are electrically isolated from the power lines 25, respectively. On the other hand, for the check mode in which the check mode signal Smod goes in an H level, all data voltage control transistors Td are turned on, the data lines 13 are conducted with the adjacent power lines 25, respectively. As a result, the data lines 13 have the approximately same potential as the source voltage VEL applied to the adjacent power lines 25, respectively. Accordingly, the potential of the data lines 13 can be set without probing the plurality of connecting terminal Px to apply a voltage from the outside. In addition, the wiring line 34 is connected to the data line driving circuit 22. When the check mode signal Smod supplied to the wiring line 34 goes in an H level, the data line driving circuit 22 makes the output terminals of all data signals D1, D2, . . . , Dn into a floating state (i.e., the data line driving circuit 22 is electrically isolated from all the data lines 13).

Figure 3:
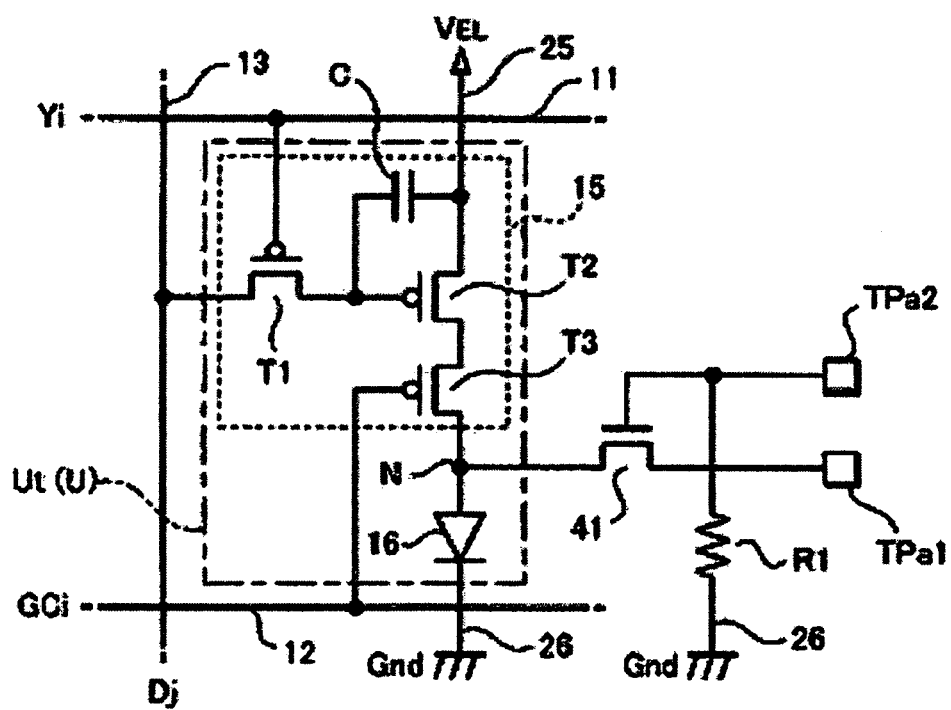
FIG. 3 is a circuit diagram illustrating a check unit circuit and a peripheral configuration of the electro-optical device according to the first embodiment of the present invention.

Next, FIG. 3 is a circuit diagram illustrating an electrical configuration of each unit circuit U. In the figure, since the check unit circuit Ut is particularly exemplified, a switching element 41 or a check terminal TPa1 connected to the check unit circuit Ut is also shown together. It is however noted that the unit circuits U themselves are in common independent of whether or not they are the check unit circuits Ut. It is assumed that the check unit circuit Ut shown in FIG. 3 belongs to a j-th column in an i-th row (j is a natural number satisfying a condition of $1 \leq j \leq n$).

As shown in the figure, one unit circuit U has a control circuit 15 and the OLED element 16 as described above. The control circuit 15 serves to control and drive the operation of the OLED 16 and includes p-channel transistors T1, T2 and T3 and a capacitive element C. The transistor T2 has a source electrode connected to a power line 25 and a drain electrode connected to a source electrode of the transistor T3. The transistor T3 has a drain electrode connected to an anode of the OLED element 16 and a gate electrode connected to a light emission control line 12 in the i-th row. The transistor T1 has a source electrode connected to a gate electrode of the transistor T2, a drain electrode connected to a data line 13 in the j-th column, and a gate electrode connected to a scan line 11 in the i-th row. The capacitive element C has one end connected to the source electrode of the transistor T1 and the gate electrode of the transistor T2 and the other end connected to the source electrode of the transistor T2 (or the power line 25). On the other hand, the OLED element 16 has a light emitting layer interposed between an anode and a cathode of the OLED element 16 and emits light with brightness depending on a forward current. The cathode of the OLED element 16 is an electrode 26 formed in common for all unit circuits U (hereinafter, referred to as a common electrode). As shown in FIG. 1, the common electrode 26 overlaps with most of the sealing plate 29, when viewed in a direction perpendicular to the substrate 10. A voltage Gnd (ground potential) at a lower side of a power source is applied to the common electrode 26 via a connecting terminal Pgnd.

Under the configuration shown in FIG. 3, when the scan signal Yi goes in the H level for the normal display mode, since the transistor T1 is turned on, the potential of the gate electrode of the transistor T2 becomes equal to a potential of a data signal Dj being supplied to the data line 13 at this point of time. Accordingly, the capacitive element C is charged at a voltage according to the data signal Dj (more specifically, a voltage corresponding to a difference between the source voltage VEL and the potential of the data signal Dj). At this time, since the light emission control signal GCi is maintained at the H level, the transistor T3 is turned off, and accordingly, the control circuit 15 is electrically isolated from the OLED element 16. Next, when an i-th horizontal scanning period elapses, the scan signal Yi goes in the H level, and accordingly, the transistor T1 is turned off, while the light emission control signal GCi goes in the L level, and accordingly, the transistor T3 is turned on. At this time, since the voltage stored in the capacitive element C is applied to the transistor T2, a current according to the data signal Dj is supplied to the OLED element 16 via the transistor T3 and the OLED element 16 emits light with brightness depending on this current.

On the other hand, as shown in FIG. 3, a source electrode of the switching element 41 is electrically connected to a junction point N of the anode of the OLED element 16 and the transistor T3 in the check unit circuit Ut. As described above, the gate electrode of the switching element 41 is connected to the check instruction terminal TPa2 and the drain electrode thereof is connected to the check terminal TPa1. A resistor R1 shown in FIG. 3 is a pull-down resistor for setting the potential of the check instruction terminal TPa2 to the Gnd potential in an open state and turning off the switching element 41, and is interposed between a wiring line, which extends from the check instruction terminal TPa2 to the gate electrode of the switching element 41, and the common electrode 26.

Next, a sequence of checking the check unit circuit Ut in the check mode will be described in detail. For this checking, a step of checking the characteristics of only the OLED element 16 after electrically isolating the OLED element 16 from the control circuit 15 in the check unit circuit Ut (hereinafter, referred to as an element check step) and a step of checking the characteristics of the entire check unit circuit Ut including the control circuit 15 (hereinafter, referred to as a unit circuit check step).

Figure 4:
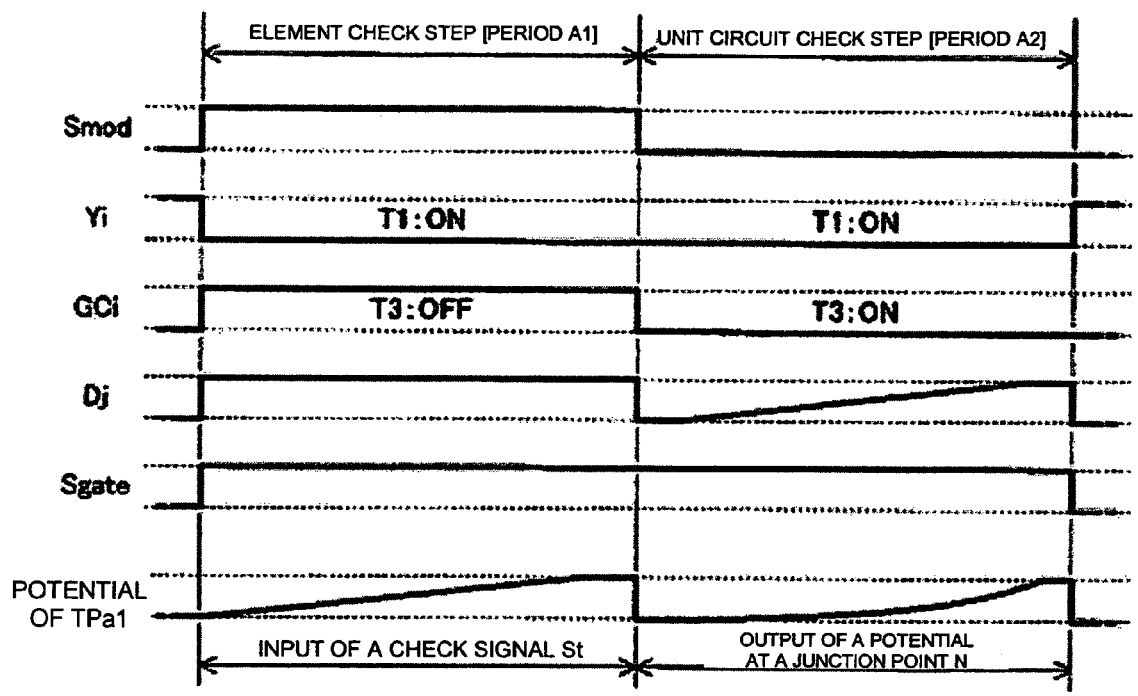
FIG. 4 is a timing chart illustrating check contents in a check mode.

First, in the element check step, the check mode signal Smod goes in the H level, as shown in FIG. 4. As a result, while the scan signal Yi supplied from each AND gate 31 to the scan line 11 is forced to be set to the L level, the light emission control signal GCi supplied from the each OR gate 32 to the light emission control line 12 is forced to be set to the H level. Thus, when the light emission control signal GCi goes in the H level, the transistor T3 in the check unit circuit Ut is turned off. Accordingly, in the element check step, the OLED element 16 in the check unit circuit Ut is electrically isolated from the control circuit 15. On the other hand, when the check mod signal Smod goes in the H level, all data voltage control transistors Td are turned on, the source voltage VEL of each power line 25 adjacent to each data line 13 is applied to the data line 13, and simultaneously, each data line 13 is electrically isolated from the data line driving circuit 22. Thus, as the transistor T2 together the transistor T3 is turned off, an affect caused by a leak current flowing into the transistors T2 and T3 can be suppressed.

In addition, as shown in FIG. 4, in the element check step, the check instruction signal Sgate input to the check instruction terminal TPa2 is maintained at an H level. Accordingly, the switching element 41 is turned on and the OLED element 16 is electrically connected to the check terminal TPa1. Under this state, a current is supplied to the OLED element 16 by input of the check signal St to the check terminal TPa1. FIG. 4 shows a case where a voltage waveform having a voltage value, which increases gradually from a start point to an end point of a period A1 for which the element check step is performed, is input as the check signal St. In the element check step, the characteristics of only the OLED element 16 in the check unit circuit Ut is checked by observing the variation of amount of emitted light of the OLED element 16 according to the rise of the voltage. For example, a relationship between a voltage value of the check signal St and the amount of emitted light of the OLED element 16 is observed, and, if this relationship satisfies preset conditions (for example, conditions that the amount of emitted light of the OLED element 16 increases in a range of an expectation value in proportion to the increase of the check signal St), the characteristics of the OLED element 16 are considered as good, and, otherwise, they are considered as bad.

On the other hand, in the unit circuit check step, as shown in FIG. 4, the check mode signal Smod goes in the L level in the same way as in the normal display mode. As a result, while the scan signal Yi output from the scan line driving circuit 21 is supplied to the scan line 11 via the AND gate 31, the light emission control signal GCi output from the scan line driving circuit 21 is supplied to the light emission control signal line 12 via the OR gate 32. On the other hand, each data voltage control transistor Td is turned off, and accordingly, the data line 13 is electrically isolated from the power line 25 and each data line driving circuit 22 is electrically connected to each data line 13.

Under this state, by controlling the scan line driving circuit 21 using a signal input to the connecting terminal Py, both of the scan signal Yi and the light emission control signal GCi go in the L level. As a result, as shown in FIG. 4, while the transistor T1 in the check unit circuit Ut is turned on and the gate electrode of the transistor T2 is electrically connected to the data line 13, the transistor T3 is turned on, and accordingly, the control circuit 15 is electrically connected to the OLED element 16. In addition, under this state, the data line driving circuit 22 is controlled such that the data signal Dj having a certain waveform is applied to the data line 13 corresponding to the check unit circuit Ut. In FIG. 4, the data signal Dj having a voltage, which increases in a straight line from a start point to an end point of a period A2 for which the unit circuit check step is performed is applied to the data line 13.

On the other hand, in the unit circuit check step, the check instruction signal Sgate is maintained at the H level and the switching element 41 is turned on, in the same way as in the element check step. Under this state, since the check terminal TPa1 has the substantially same potential as the junction point N of the check unit circuit Ut, the variation of a driving voltage applied to the OLED element 16 depending on the variation of the data signal Dj can be observed from the check terminal TPa1. Accordingly, by measuring the variation of the potential of the check terminal TPa1 according to the supply of the data signal Dj, the driving characteristics of the OLED element in the check unit circuit Ut can be checked. In other words, the variation of the potential of the check terminal TPa1 (i.e., the potential at the junction point N) is compared to the waveform of the data signal Dj, and, if a certain relationship therebetween is established, the characteristics of the check unit circuit Ut are considered as good, and, otherwise, a defect is considered to occur in the check unit circuit Ut. For example, as shown in FIG. 4, if the potential of the junction point N detected from the check terminal TPa1 is varied to follow the variation of the potential of the data signal Dj, the characteristics of the check unit circuit Ut are considered as proper. In this way, the check terminal TPa1 is used as both a terminal for inputting the check signal St in the element check step and a terminal for outputting the potential at the junction point N in the unit circuit check step.

As described above, in this embodiment, since the characteristic of only the OLED element 16 can be independently checked under the state where the control circuit 15 is electrically isolated from the OLED element 16, defects occurring in the OLED element 16 can be quickly detected. In addition, since the characteristics of the entire unit circuit U can be checked in addition to the characteristics of only the OLED element 16, locations at which defects occur (for example, which of the OLED element 16 and the control circuit has defects) can be quickly and precisely detected, taking a result of these checks into general account. In addition, since the checking operation is performed using the check terminal TPa1 or the check instruction terminal TPa2 arranged at the outside of the sealing plate 29, there is an advantage in that the electro-optical device D after the sealing plate 29 is bonded can be checked using a non-destruction method.

In order to check the OLED element 16 in the check unit circuit Ut independently, the junction point N of the check unit circuit Ut may be directly connected to the check terminal TPa1. However, under this configuration, since the conduction of the check unit circuit Ut with the check terminal TPa1 is maintained even in the normal display mode, various defects may occur. For example, the check unit circuit Ut is affected by a parasite capacitance due to the check terminal TPa1, or noise derived from the check terminal circuit Ut may reach the check unit circuit Ut. In addition, for example, when the check unit circuit Ut is affected by the parasite capacitance due to the check terminal TPa1, the characteristics of the check unit circuit Ut become greatly different from those of other unit circuits U, which results in deterioration of quality of display. On the contrary, according to this embodiment, since the switching element 41 is turned off and the check terminal TPa1 is electrically isolated from the check unit circuit Ut in the normal display mode, the above-mentioned defects can be avoided such that there does not occur a difference in characteristics between the check unit circuit Ut and other unit circuits U.

In addition, in this embodiment, since the object of the checking operation is not the dummy element 18, which does not contribute to display of images, but the OLED element 16 in the check unit circuit Ut belonging to the effective region A, the effectiveness of the checking operation can be further enhanced, as compared to the case where the dummy element 18 is the object of the checking operation. This effect will be described in detail as follows.

Figure 5:
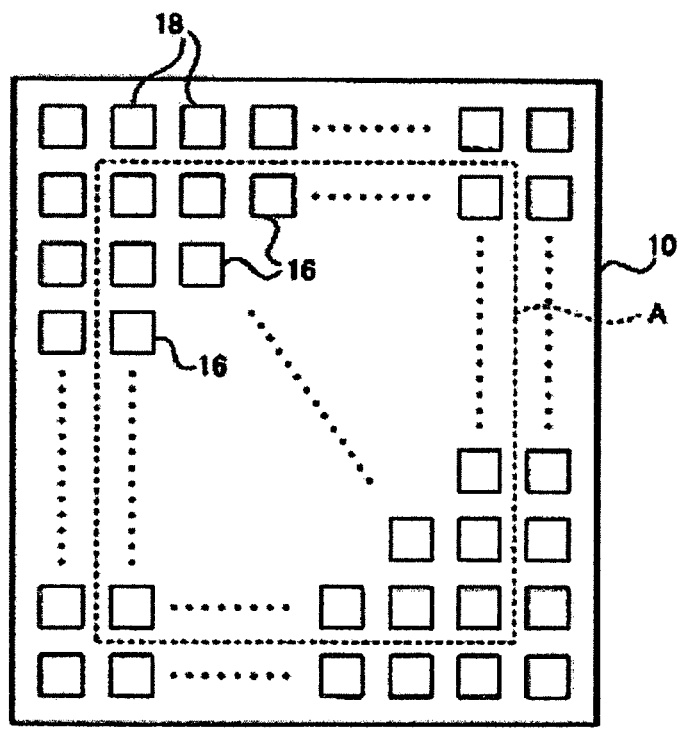
FIG. 5 is a plan view for explaining effects of the first embodiment of the present invention.

FIG. 5 is a plan view illustrating the arrangement of the OLED elements 16 and the dummy elements 18 formed on the substrate 10. As shown in the figure, while each OLED element 16 belonging to the effective region A is surrounded by 8 OLED elements 16, each dummy element 18 located at the outside of the effective region A is partially surrounded by the total number of 5 or 3 of dummy elements 18 and OLED elements 16. In this way, since the dummy elements 18 and the OLED elements 16 in the effective region A have different continuity of the arrangement, formation conditions of the OLED elements 16 are different from those of the dummy elements 18. For example, when the OLED elements 16 are formed by applying light emitting material on the substrate 10 using an inkjet method and drying it, since conditions when the light emitting material is dried are different depending on its position, it can be said that the characteristics of the OLED elements 16 may be particularly different from those of the dummy elements 18. Such a characteristic difference can also occur in a case (so-called multiple panel fabrication method) where a plurality of electro-optical devices D is collectively formed from one large substrate (so-called mother glass).

Accordingly, when the dummy elements 18 are taken as the object of the checking operation, there is a possibility that a result of the checking operation is estranged from actual quality of each OLED element 16 in the effective region A. For example, although the characteristics of each OLED element 16 in the effective region A are actually good, if the characteristics of the dummy elements 18 are poor due to deviation of conditions for a manufacturing process, the quality of the electro-optical device D must be determined by checking turning-on of individually completed electro-optical devices D. On this account, since it takes time to determine the quality of the electro-optical devices D, a feedback to the manufacturing process is delayed. On the contrary, in this embodiment, since the OLED elements 16 in the effective region A contributing to an actual display are the checking object, the quality of the OLED elements 16 can be automatically determined with electrical high precision and simplification with no effect on deviation of conditions in the manufacturing process. In addition, in order to maintain the precision of the checking when the dummy elements 18 are the checking object, it is required to maintain the characteristics of the dummy elements 18 equal to the characteristics of the OLED elements 16 in the effective region A. To this end, it is required to secure a relatively wide space in which many dummy elements 18 are formed. This is because it is required to distribute the dummy elements 18 to be checked with the same density as the OLED elements 16. On the contrary, in this embodiment, since the dummy elements 18 are not the checking object, it is not required to maintain the characteristics of the dummy elements 18 equal to those of the OLED elements 16 in the effective region A. Accordingly, this embodiment has an advantage of the reduction of a space in which the dummy elements 18 are formed.

Figure 6:
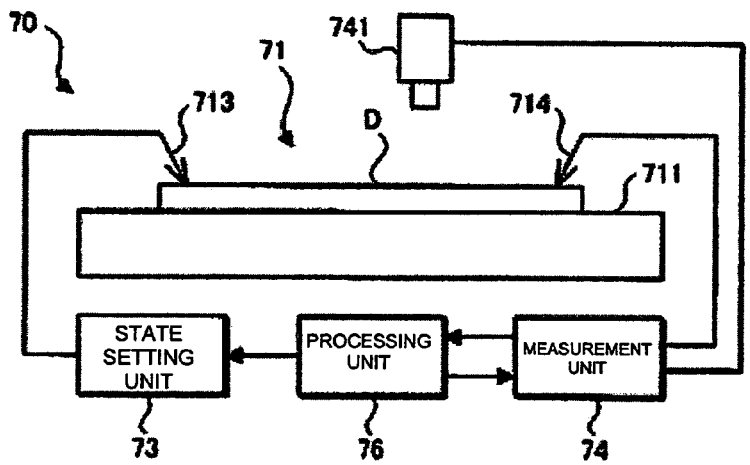
FIG. 6 is a block diagram illustrating a check apparatus for checking the electro-optical device according to the first embodiment of the present invention.

The above-described checking operation is performed using, for example, a checking apparatus 70 having a configuration as shown in FIG. 6. As shown in the figure, the checking apparatus 70 has a probing unit 71 including a stage 711 on which the electro-optical device D to be checked is positioned and mounted. The probing unit 71 further includes an input probe 713 and an output probe 714 whose leading ends are directed to the stage 711. The input probe 713 and the output probe 714 are checking needles having acicular leading ends contacting the contacting terminals of the electro-optical device D. Of these probes, the input probe 713 is connected to a state setting unit 73. The state setting unit 73 is means for generating various signals to be input to the electro-optical device D and supplying them to the input probe 713 in the check mode. More specifically, the state setting unit 73 generates and outputs the check mode signal Smod, the check instruction signal Sgate and the check signal St in the element check step. These signals are supplied to the check mode terminal TPa3, the check instruction terminal TPa2 and the check terminal TPa1, respectively, via the input probe 713. In addition, in the unit circuit check step, the state setting unit 73 outputs signals for controlling the scan line driving circuits 21 and the data signal Dj, in addition to the check mode signal Smod and the check instruction signal Sgate, from the input probe 713 to the connecting terminal Py and the connecting terminals Px.

On the other hand, a measurement unit 74 shown in FIG. 6 serves as means for measuring a voltage output from the check terminal TPa2 in the unit circuit check step and is connected to the output probe 714 and a luminance meter 741 for outputting an electrical signal depending on the amount of light emitted from the electro-optical device D. With this configuration, the measurement unit 74 measures the amount of light emitted from the OLED elements 16 in the check unit circuits Ut in the element check step and the unit circuit check step, based on the electrical signal from the luminance meter 741. On the other hand, the output probe 714 contacts with the check terminal TPa1 in the unit circuit check step. Under this condition, the measurement unit 74 detects the potential of the check terminal TPa1 (i.e., the potential at the junction point N) from the output probe 714.

A processing unit 76 shown in FIG. 6 serves as means for controlling the state setting unit 73 and the measurement unit 74. The processing unit 76, such as a personal computer, includes a display for displaying a result of the checking and a plurality of manipulators manipulated by an operator. When a start of the element check step and the unit circuit check step is instructed according to a manipulation to the manipulators, the processing unit 76 outputs an instruction for a start of each step or an instruction for an input of a signal (for example, the check signal St) to the electro-optical device D in each step to the state setting unit 73. In addition, the processing unit 76 processes measurement values, such as the potential at the junction point N or the amount of light emitted from the OLED elements 16 in each step, measured by the measurement unit 74 and displays the measurement values on the display. The operator can determine the quality of the electro-optical device D by confirming this display.

Next, detailed configuration of the check unit circuits Ut and the switching element 41 will be described with reference to FIG. 7. Although only the transistor T3 of the control circuit 15 and the switching element 41 are shown in the figure, the transistor T1 and T2 are configured in a similar manner. In addition, transistors composing the scan line driving circuits 21 or the data line driving circuit 22 or data voltage control transistors have a configuration similar to the transistor T3 or the switching element 41 in FIG. 7.

Figure 7:
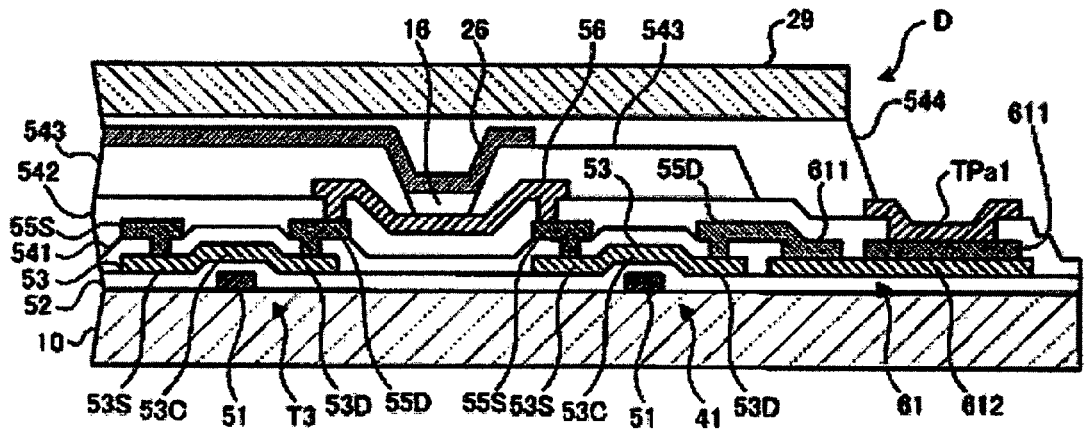
FIG. 7 is a sectional view illustrating the check unit circuit and the peripheral configuration of the electro-optical device according to the first embodiment of the present invention.

As shown in FIG. 7, each of the transistor T3 and the switching element 41, formed on the substrate 10, includes a gate electrode 51 formed on the surface of the substrate 10 and made of aluminum, a MoW alloy, polysilicon, etc., a gate insulating layer 52 formed on the substrate 10, covering the gate electrode 51, and a semiconductor layer 53 formed on the surface of the gate insulating layer 52. The semiconductor layer 53 is a film formed of, for example, polysilicon, and includes a channel region 53C facing the gate electrode 51 with the gate insulating layer 52 interposed therebetween, a drain region 53D and a source region 53S formed on both sides of the channel region 53C. Source electrodes 55S and drain electrodes 55D of the transistor T3 and the switching element 41 are formed on a surface of a first interlayer insulating layer 541 formed to cover the semiconductor 53 and are electrically connected to the source region 53S and the drain region 53D of the semiconductor layer 53, respectively.

Figure 8:
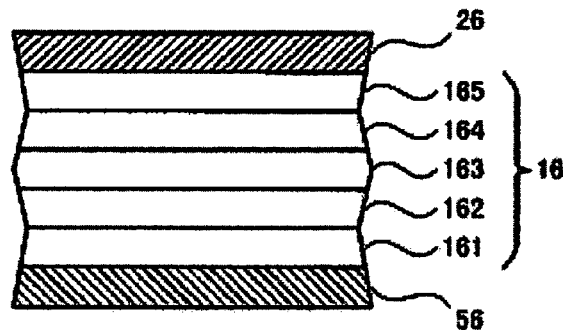
FIG. 8 is a sectional view illustrating a stack structure of an OLED element in the check unit circuit of the electro-optical device according to the first embodiment of the present invention.

In addition, a pixel electrode 56 is formed on a surface of a second interlayer insulating layer 542 covering the source electrodes 55S and the drain electrodes 55D. The pixel electrode 56 is made of a conductive material having light transmission, such as an indium tin oxide (ITO), and is electrically connected to the drain electrode 55D of the transistor T3 and the source electrode 55S of the switching element 41. A partition wall layer 543 is formed on the surface of the second interlayer insulating layer 542. The partition wall layer 543 is a film for partitioning adjacent OLED elements 16 and has an opening opened to an OLED element 16. The OLED element 16 is formed to enter the opening using a film formation technique such as the inkjet method or the vacuum deposition method. As shown in FIG. 8, the OLED element 16 has a configuration that five layers, that is, a hole injection layer 161, a hole transport layer 162, a light emitting layer 163, an electron transport layer 164 and an electron injection layer 165, are stacked in order from an anode (of the pixel electrode 56) to a cathode (of the common electrode 26). However, layers other than the light emitting layer 163 may be omitted if proper. As described above, the common electrode 26 shown in FIG. 7 is formed of a light reflective material such as metal, for example, aluminum or silver, or an alloy containing aluminum or silver as a main component such that the common electrode 26 overlaps with all unit circuits U and all dummy elements 18 when viewed from a plate plane perpendicular to the substrate 10. A sealing plate 29 is bonded, via an adhesive layer 544, to the surface of the substrate 10 on which the above mentioned elements are formed.

Figure 9:
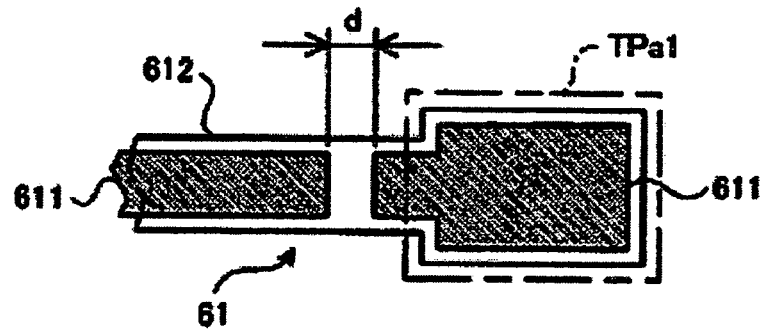
FIG. 9 is a plan view illustrating a configuration near a check terminal in the electro-optical device according to the first embodiment of the present invention.

In addition, the check terminal TPa1 and a wiring line 61 extending from the switching element 41 to the check terminal TPa1 are formed of the same material and in the same process as layers composing the transistor T3 and the switching element 41. FIG. 9 is a plan view illustrating the configuration of the check terminal TPa1 and the wiring line 61 connected to this terminal. In this figure, a shape of the check terminal TPa1 is indicated by a chain line. As shown in FIGS. 7 and 9, the check terminal TPa1 is formed of the same material and in the same process as the pixel electrode 56. That is, the pixel electrode 56 and the check terminal TPa1 are collectively formed by patterning a conductive film formed to cover the second interlayer insulating layer 542. On the other hand, the wiring line 61 has a configuration that a plurality of first wiring lines 611 formed in the same process as the source electrode 55S and drain electrode 55D (wiring line layer) and a second wiring line 612 formed in the same process as the semiconductor layer 53 are stacked in order when viewed from the substrate 10. The second wiring line 612 is formed by heavily doping impurities into a film made of polysilicon and extends from a portion electrically connected to the drain electrode 55D of the switching element 41 to a circumferential edge of the substrate 10 in such a manner that the second wiring line 612 overlaps with the check terminal TPa1. The plurality of first wiring lines 611 is formed to be spaced apart from one another with an interval d therebetween when viewed from a direction perpendicular to the substrate 10 and is electrically connected to one another via the second wiring line 612, as shown in FIG. 9.

Here, each first wiring line 611 is formed of a conductive material having low resistivity and composed of one of aluminum, molybdenum (Mo), tungsten (W), tantalum (Ta), copper (Cu), etc. and an alloy thereof, and is apt to be corroded by water or ions. On the other hand, the second wiring line 612 is formed of a conductive material, such as polysilicon, having resistivity higher than that of the first wiring lines 611, and has anti-corrosivity higher than that of the first wiring lines 611. Here, in a configuration that the wiring line 61 is formed of a single first wiring line 611, there is a possibility that corrosion occurring at the check terminal TPa1 side of the wiring line 61 will spread to the switching element 41, thereby deteriorating the characteristics of the switching element 41. On the contrary, in this embodiment, since the first wiring lines 611 are formed in plural, spaced apart from another, even if corrosion occurs in the check terminal TPa1, this corrosion spreads just up to one first wiring line 611 but not to the other remaining first wiring lines 611 or the switching element 41. Moreover, this configuration has an advantage over a configuration of only the second wiring line 612 in that resistance of the wiring line 61 is suppressed to be low.

In addition, although the configuration of the wiring line 61 extending from the switching element 41 to the check terminal TPa1 has been described here, wiring lines connected to connecting terminals for input of other signals may be also configured in a similar way. That is, these wiring lines include a plurality of first wiring lines formed of a conductive material having low resistivity and spaced apart from one another and a second wiring line formed of a conductive material having high corrosion resistance for conducting the plurality of first wiring lines. A part Ad shown for each connecting terminal except a power source terminal in FIG. 1 corresponds to a part where the plurality of first wiring lines is spaced apart from one another (a part having an interval d shown in FIG. 9).

As described above, the characteristics of only the OLED elements 16 or the characteristics of the entire unit circuits U can be checked using the switching elements 41 in the check mode. In this embodiment, however, an element for checking the electro-optical device D in more respects (hereinafter, referred to as a check auxiliary element) is formed on the substrate 10. The check auxiliary element includes groups of alignment patterns AP, a checking transistor 95, and a checking OLED element 97. These check auxiliary elements will be described in detail as below.

Figure 10:
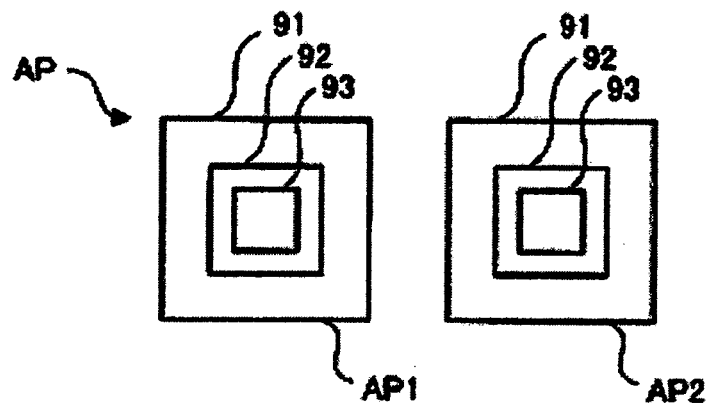
FIG. 10 is a plan view illustrating a configuration of a group of alignment patterns in the electro-optical device according to the first embodiment of the present invention.

To begin with, the groups of alignment patterns AP shown in FIG. 1 are patterns for checking whether or not the relative positional relationship or film thickness of layers composing the OLED elements 16 is appropriate, and are disposed near a corner in the left top portion and a corner in the right top portion of the sealing plate 29, as shown in FIG. 1. Each group of the alignment patterns AP includes a first alignment pattern AP1 and a second alignment pattern AP2, which are disposed adjacent to each other. FIG. 10 is an enlarged plan view of a group of alignment patterns AP. As shown in the figure, each of the first alignment pattern AP1 and the second alignment pattern AP2 has a configuration that a first layer 91, a second layer 92 and a third layer 93, each having an approximately rectangular shape when viewed from top, are stacked in order, when viewed from the substrate 10, with a co-axis. The first layer 91 has a dimension larger than that of the second layer 92, and the second layer 92 has a dimension larger than that of the third layer 93, with equal side intervals. Although the patterns are exemplified as the rectangular shape in this embodiment, they may have other polygonal shapes or a ring shape. Further, a rough surface and the group of patterns may have additionally required patterns depending on the number of stacks of layers of the electro-optical elements, apart from the first and second alignment patterns AP1 and AP2.

The first layer 91, the second layer 92 and the third layer 93 of the first alignment pattern AP1 are formed of the same material and in the same process as the pixel electrode 56, the hole injection layer 161 composing the OLED element 16, and the hole transport layer 162 composing the OLED element 16, respectively. On the other hand, the layers composing the second alignment pattern AP2 have a combination different from that of the layers composing the first alignment pattern AP1. More specifically, the first layer 91, the second layer 92 and the third layer 93 of the second alignment pattern AP2 are formed of the same material and in the same process as the pixel electrode 56, the hole transport layer 162, and the light emitting layer 163, respectively. By observing a positional relationship between the layers of the first and second alignment patterns AP1 and AP2 using a microscope, it can be checked whether or not the layers composing the OLED element 16, the pixel electrode 56 and the common electrode 26 are formed in a proper positional relationship among them or with proper pattern widths. For example, by observing the first alignment pattern AP1, it can be checked whether or not the pixel electrode 56, the hole injection layer 161 and the hole transport layer 162 are formed at proper positions and proper pattern widths. In addition, by measuring the film thickness of the first to third layers 91 to 93 using an optical interferometer, it can be determined whether each of the layers composing the OLED element 16 is formed at a proper film thickness.

On the other hand, the checking transistor (a so-called test element group (TEG)) 95 shown in FIG. 1 is used to check whether or not electrical characteristics of the transistors (for example, the transistors composing the scan line driving circuits 21 or the data line driving circuit 22) included in the electro-optical device D are proper. The checking transistor 95 is a transistor formed in the same process as the transistors T1 to T3 of each unit circuit U, and has a drain electrode connected to the connecting terminal TPb1, a source electrode connected to the connecting terminal TPb1, and a gate electrode connected to the connecting terminal TPb3. In the inspection process of the electro-optical device D, when the checking transistor 95 is turned on by applying a voltage from the input probe 713 to the connecting terminal TPb3, a voltage is applied from the input probe 713 to the connecting terminal TPb1, and a current flowing into the connecting terminal TPb2 at this time is detected by the output probe 714. In this way, by observing whether or not the checking transistor 95 is properly operated, it can be estimated whether or not the characteristics of the transistors of each unit circuit U are proper.

In addition, the single checking OLED element 97 using the dummy elements shown in FIG. 1 is an element provided to simply compare and check variation or abnormality of the characteristics of the OLED element 16 in each unit circuit U for analysis of abnormality occurring during the operation of the electro-optical device D, and includes an OLED element 971 formed in the same process as the OLED element 16 in each unit circuit U and an electrode 972 formed in the same process as the pixel electrode 56 and connected to a connecting terminal TPc. In the inspection process of the electro-optical device D, a voltage is applied from the input probe 713 to the electrode 972 and the common electrode 26 via the connecting terminal TPc and the connecting terminal Pgnd, and, by observing the amount of light emission or the electrical characteristics of the OLED element 971, it can be estimated whether or not the characteristics of the OLED element 16 included in each unit circuit U are proper or changed with time.

2. Second Embodiment

Next, an electro-optical device D according to a second embodiment of the present invention will be described. In the first embodiment, the configuration where the switching element 41 is interposed between the check terminal TPa1 and the OLED element (more specifically, the junction point N) 16 in each check unit circuit Ut has been exemplified. The second embodiment employs an anti-fuse instead of the switching element 41. Except this configuration, the electro-optical device D of the second embodiment has the same configuration as that of the first embodiment, and therefore, only the anti-fuse will be hereinafter described and the explanation of other remaining elements will be omitted for the sake of simplification of the description.

Figure 11:
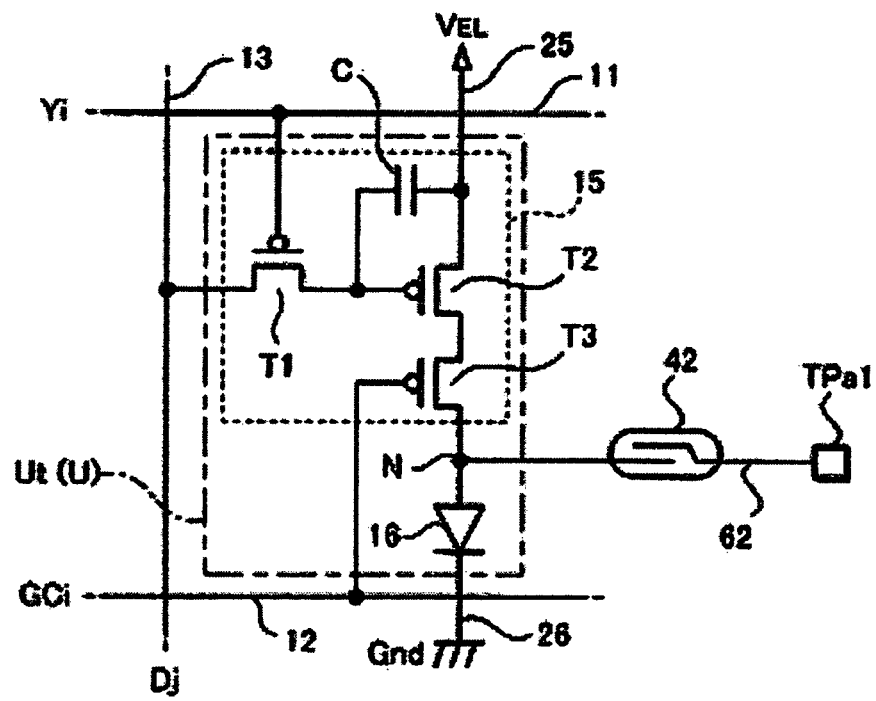
FIG. 11 is a circuit diagram illustrating a check unit circuit and a peripheral configuration of an electro-optical device according to a second embodiment of the present invention.

FIG. 11 is a circuit diagram illustrating a check unit circuit Ut and its peripheral configuration according to the second embodiment. As shown in the figure, an anti-fuse 42 has one end connected to the junction point N in the check unit circuit Ut and the other end connected to the check terminal TPa1. The anti-fuse 42 is an element having an initial state (a step immediately after manufactured) where its one end is electrically isolated from the other end, and thereafter, a state where the one end is electrically connected to the other end (hereinafter, referred to as an on state).

Figure 12:
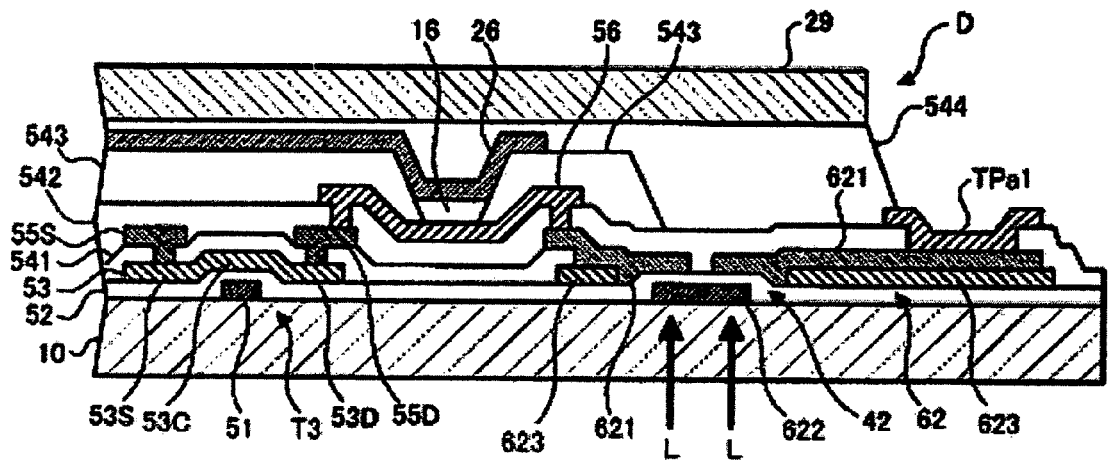
FIG. 12 is a sectional view illustrating the check unit circuit and the peripheral configuration of the electro-optical device according to the second embodiment of the present invention.
Figure 13:
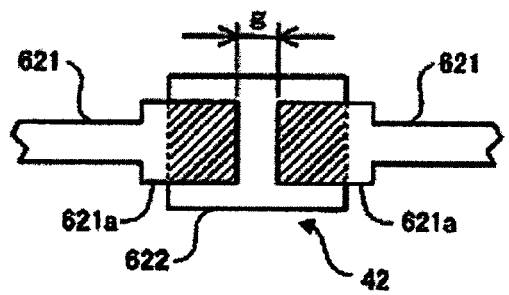
FIG. 13 is a plan view illustrating a configuration of an anti-fuse connected to the check unit circuit in the electro-optical device according to the second embodiment of the present invention.

Next, FIG. 12 is a sectional view illustrating a configuration from the check unit circuit U to the check terminal TPa1 in this embodiment, and FIG. 13 is a plan view illustrating a configuration of the anti-fuse 42. As shown in these figures, a wiring line 62 extending from the junction point N to the check terminal TPa1 has a plurality of first wiring lines 621 spaced apart from one another with an interval g. Of these first wiring lines 621, one first wiring line 621 (a first wiring line 621 in the left side of FIG. 12) is connected to the junction point N in the check unit circuit Ut, and the other first wiring line 621 (a first wiring line 621 in the right side of FIG. 12) is connected to the connecting terminal TPa1. In addition, an auxiliary wiring line 623 made of the same material as the semiconductor layer 53 is formed on a lower layer of each first wiring line 621. As shown in FIG. 13, a portion 621a near the other first wiring line 621 has a width wider than widths of other portions. In addition, an intermediate portion 622 is formed on the surface of the substrate 10. The intermediate portion 622 is a film formed of the same material and the same process as the gate electrode 13 of the transistor T3. In FIG. 13, regions at which the intermediate portion 622 overlaps with the first wiring lines 621 are indicated by oblique lines. As shown in this figure, the intermediate portion 622 overlaps with the portions 621a of both first wiring lines 621 with the gate insulating layer 52 interposed therebetween when viewed from a direction perpendicular to the substrate 10. The anti-fuse 42 shown in FIG. 11 is composed of the first wiring lines 621 and the intermediate portion 622. In FIGS. 12 and 13, the anti-fuse 42 is shown to have a state where the one end is electrically isolated from the other end by the gate insulating layer 52 (initial state).

Under such a configuration, when the overlapping regions of the intermediate portion 622 and the first wiring lines 621 are energized by irradiating the overlapping regions with energy flux L of high density, such as a laser beam, from the substrate 10 side or the sealing plate 29 side, they are melt, and accordingly, the first wiring lines 621 are electrically connected to the intermediate portion 622. As the laser beam irradiated on the anti-fuse 42, a laser beam having a wavelength that can be easily absorbed by the intermediate 622 or the first wiring line 621 (for example, an infrared ray) is used. In this way, when the anti-fuse 42 is turned on, since the check unit circuit Ut is electrically connected to the check terminal TPa1, the element check step and the unit circuit check step as described in connection with the first embodiment can be performed. In more detail, for an electro-optical device D confirmed that it has a defect when images are actually displayed after the electro-optical device D is manufactured, the checking operation is performed after the anti-fuse 42 is turned on.

As described above, this embodiment can obtain the same effect as the first embodiment. For example, since the first wiring lines having low anti-corrosivity of the wiring line 62 extending from the OLED element 16 to the check terminal TPa1 are formed spaced apart from each other, even if corrosion occurs in the check terminal TPa1 side of the first wiring lines 621, this corrosion does nor reach the OLED element 16. In addition, in this embodiment, as shown in FIG. 12, since the anti-fuse 42 is formed at a position at which the anti-fuse 42 dose not overlap with the common electrode 26 or the partition wall layer 543, the laser beam can be efficiently irradiated on the anti-fuse 42. In addition, the configuration of the anti-fuse 42 is not limited to one shown in FIGS. 12 and 13. For example, the anti-fuse 42 may be formed with the plurality of first wiring lines 621 spaced apart from one another with a narrow interval. In this case, the first wiring lines 621 can be electrically connected therebetween by energizing end portions of the first wiring lines 621. In addition, a portion formed by spacing a wiring line formed in the same process as the semiconductor layer 53 and a wiring line formed in the same process as the drain electrode or the source electrode from each other may be used as the anti-fuse 42. In this case, the wiring lines can be electrically connected therebetween by energizing end portions of the wiring lines.

3. Modifications

The above-described embodiments may be modified in various ways. Detailed aspects of the modifications are as follows. The following aspects may be used in proper combination.

(1) The element for supplying the checking signal to the OLED element 16 in each unit circuit Ut (checking signal supply element) is not limited to the switching element 41 and the anti-fuse 42. For example, instead of the switching element 41 and the anti-fuse 42, a switching element formed of a first electrode made of titanium and a second electrode made of copper with solid electrolyte, such as copper sulfide, interposed therebetween (a so-called nano bridge) may be employed. In this switching element, when a negative voltage is applied to the first electrode, copper ions are dissolved out as solid electrolyte by oxidation reaction in the second electrode, and copper ions are educed as copper metal by reduction reaction in the first electrode. Thus, the switch element is turned on when the copper educed from the first electrode reaches the second electrode. In addition, when a positive voltage is applied to the first electrode, the switching element is turned off as a cross linking formed between both electrodes becomes extinct.

In addition, although the configuration that the anti-fuse 42 is turned on by irradiating the anti-fuse 42 with the laser beam has been exemplified in the second embodiment, the anti-fuse 42 may be turned on by energizing it using other ways (for example, an electric field, thermal or mechanical energy). In this way, the check signal supply element in the present invention is sufficient if only it is an element having a first state where the OLED element 6 in the check unit circuit Ut is electrically isolated from the check terminal TPa1 and a second state where the OLED element 16 in the check unit circuit Ut is electrically connected to the check terminal TPa1, regardless of reversibility from the first state to the second state and vice versa or methods for changing from the first state to the second state.

(2) The configuration of the control circuit 15 for controlling the operation of the OLED element 16 in each unit circuit U is not limited to one shown in FIG. 3. For example, although the electro-optical device D employing a voltage programming method for storing a voltage according to the potential of the data line 13 in the capacitive element C and supplying a current to the OLED element 16 has been exemplified in the above described embodiments, the present invention may be applied to the electro-optical device D employing a current programming method for storing a voltage according to a current flowing into the data line 13 in the capacitive element C. In addition, although the configuration that the control circuit 15 and the OLED element 16 are switched over between the conduction and the non-conduction by controlling the transistor T3 has been exemplified in the above-described embodiments, the transistor T3 is not necessarily required. However, the transistor can completely exclude an effect of the control circuit 15 in the element check step of the check mode, thus allowing checking of the characteristics of only the OLED element 16 with high precision.

(3) Although the configuration that three unit circuits U located at one corner in the effective region A are assumed as the check unit circuits Ut has been exemplified in the above-described embodiments, the number or position of the check unit circuits Ut is not limited to this. For example, the unit circuits U located at four corners in the effective region A may be assumed as the check unit circuits Ut, or the unit circuits U located at a central portion in the effective region A may be assumed as the check unit circuits Ut. However, considering that errors of the characteristics of the OLED elements 16 located at a peripheral region of the effective region A are apt to occur as compared to other OLED elements 16, it is preferable that the check unit circuits Ut are disposed at the corners in the effective region A. In addition, the configuration that the check unit circuits Ut are disposed at the corners in the effective region A facilitates interconnection between the check unit circuits Ut and the check terminal TPa1.

(4) The present invention is applicable to the electro-optical device using electro-optical elements other than the OLED elements. For example, in the same way as the above-described embodiments, the present invention is applicable to various electro-optical devices including display apparatuses, such as field emission type displays (FEDs, including surface conduction type displays (SEDs) or ballistic electron surface-emitting displays (BSDs)) using electro-optical elements composed of electron emitters, such as hot cathodes or cold cathodes, and fluorescent substance with which electrons emitted from the electron emitters collide, active matrix type electrophoresis displays or toner displays using non-emission type electro-optical elements having memorial properties, and twist ball displays, or optical line heads of optical printers or image formation apparatuses. In addition, although the electro-optical device using the electro-optical elements for converting the electrical operation into the optical operation has been exemplified in the above-described embodiments, the present invention is also applicable to the electro-optical device using the electro-optical elements for converting the optical operation into the electrical operation, for example, electro-optical devices employing light receiving elements, such as charge coupled device (CCD) or CMOS sensors for outputting electrical signals based on the amount of light received, or large X ray image sensors, as electro-optical elements. These electro-optical devices are employed for various electronic equipments including scanners or checking devices for reading images of manuscripts, or medical instruments, for example.

4. Applications

Figure 14:
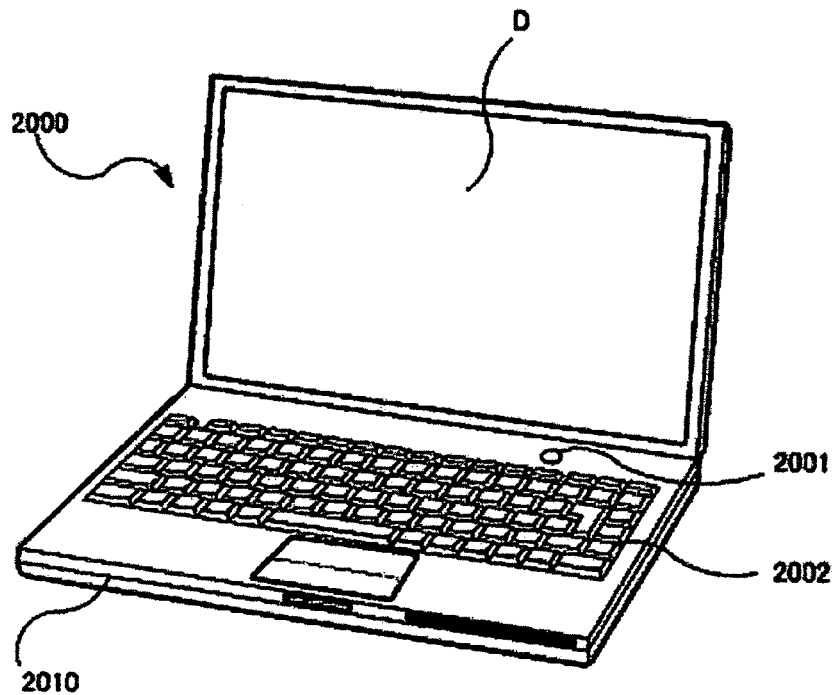
FIG. 14 is a perspective view illustrating a configuration of a personal computer to which the present invention is applied.

Next, electronic equipments to which the electro-optical device D according to the present invention is applied will be described. FIG. 14 shows a configuration of a mobile personal computer to which the electro-optical device D according to the above described embodiments is applied. A personal computer 2000 includes the electro-optical device D as a display unit and a body 2010. The body 2010 includes a power switch 2001 and a keyboard 2002. The electro-optical device D can display a screen having a wide viewing angle through which images are well visible.

Figure 15:
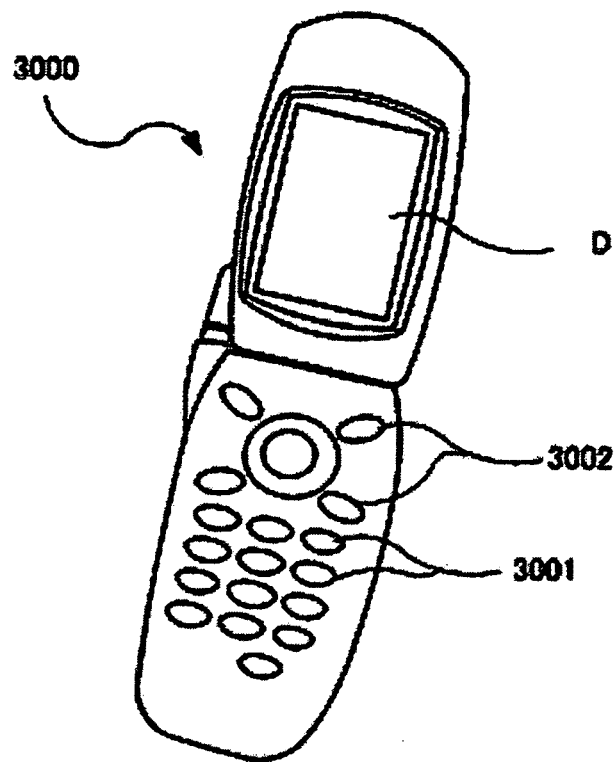
FIG. 15 is a perspective view illustrating a configuration of a mobile phone to which the present invention is applied.

FIG. 15 shows a configuration of a mobile phone to which the electro-optical device D according to the above described embodiments is applied. A mobile phone 3000 includes a plurality of manipulating buttons 3001, several scroll buttons 3002, and the electro-optical device D as a display unit. A screen displayed on the electro-optical device D is scrolled by manipulating the scroll buttons 3002.

Figure 16:
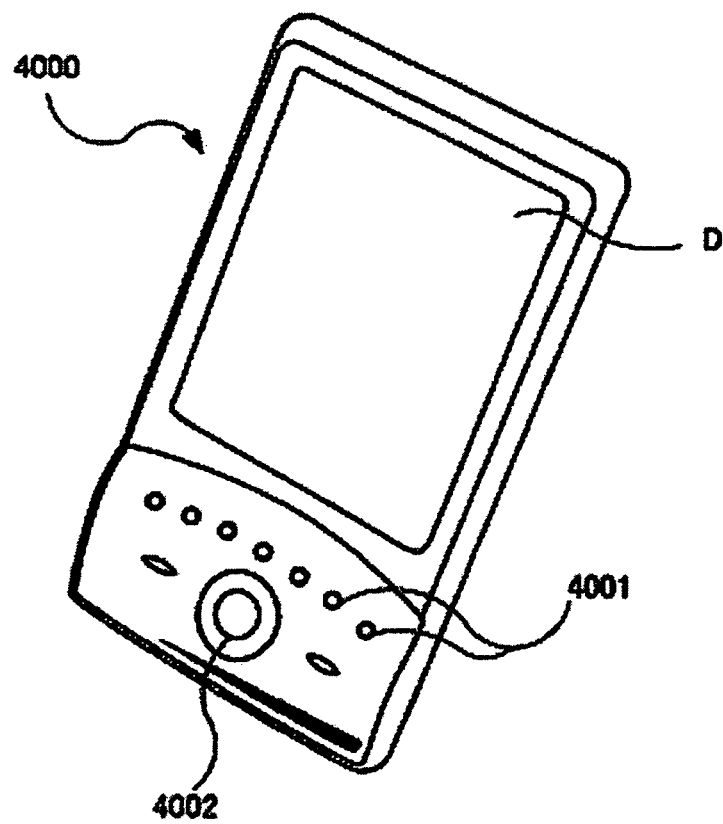
FIG. 16 is a perspective view illustrating a configuration of a personal digital assistant to which the present invention is applied.

FIG. 16 shows a configuration of a personal digital assistant (PDA) to which the electro-optical device D according to the above described embodiments is applied. A PDA 4000 includes a plurality of manipulating buttons 4001, a power switch 4002, and the electro-optical device D as a display unit. Various kinds of information such as an address book or a schedule book are displayed on the electro-optical device D by manipulating the power switch 4002.

Further, in addition to ones shown in FIGS. 14 to 16, the electronic equipments to which the electro-optical device D according to the present invention is applied may include digital cameras, television sets, view finder type or monitor direct-view type video tape recorders, car navigators, pagers, electronic pocket notebooks, calculators, word processors, workstations, video telephones, point-of-sale (POS) terminals, scanners, apparatuses equipped with touch panels, etc.

What is claimed is:

1. An electro-optical device comprising:
    a plurality of unit circuits, each including an electro-optical element and a control circuit for controlling the electro-optical element;
    a check terminal to which a check signal for driving the electro-optical element is input; and
    a check signal supply element provided between an electro-optical element in a check unit circuit selected, as a check object, from the plurality of unit circuits and the check terminal, the check signal supply element having a first state where the electro-optical element in the check unit circuit is electrically isolated from the check terminal and a second state where the electro-optical element in the check unit circuit is electrically connected to the check terminal.

2. The electro-optical device according to claim 1, further comprising:
    a check instruction terminal to which a check instruction signal for instructing execution of check of the electro-optical element is input,
    wherein the check signal supply element is a switching element that is switched over from one of the first state and the second state to the other, based on the check instruction signal input from the check instruction terminal.

3. The electro-optical device according to claim 1, wherein the check signal supply element is an anti-fuse changing from the first state to the second state when the anti-fuse is energized.

4. The electro-optical device according to claim 3, wherein the control circuit in each of the plurality of unit circuits includes a transistor element having a semiconductor layer and a gate electrode, the semiconductor layer being connected to a wiring line layer, and the gate electrode opposing the semiconductor layer with a gate insulating layer interposed therebetween, and wherein the anti-fuse has a first end formed of the same material as the wiring line layer and connected to the electro-optical element in the check unit circuit, a second end formed of the same material as the wiring line layer, spaced apart from the first end, and connected to the check terminal, and an intermediate portion formed of the same material as the gate electrode and opposing the first end and the second end with the gate insulating layer interposed therebetween, the first end being electrically connected to the second end via the intermediate portion when a portion where the intermediate portion opposes the first and second ends is energized.

5. The electro-optical device according to claim 1, wherein the check unit circuit includes unit circuits, located at a circumferential edge of an effective region, of the plurality of unit circuits arranged in a plane shape and forming the effective region.

6. The electro-optical device according to claim 5, wherein the check unit circuit includes unit circuits, located at a corner of the effective region, having an approximately rectangular shape, of the plurality of unit circuits.

7. The electro-optical device according to claim 5, further comprising:
    dummy electro-optical elements arranged around the effective region.

8. The electro-optical device according to claim 1, wherein the control circuit in each of the plurality of unit circuits has a switching element for switching between electrical conduction and non-conduction between the electro-optical element and the control circuit.

9. The electro-optical device according to claim 1, further comprising:
    a wiring line interposed between the electro-optical element and the check terminal,
    wherein the wiring line includes a plurality of first wiring lines formed spaced apart from one another, and a second wiring line formed of a material having anti-corrosivity higher than that of the first wiring lines, for electrically connecting the plurality of first wiring lines to one another.

10. The electro-optical device according to claim 9, wherein the control circuit in each of the plurality of unit circuits includes a transistor element having a semiconductor layer and a gate electrode, the semiconductor layer being connected to a wiring line layer, and the gate electrode opposing the semiconductor layer with a gate insulating layer interposed therebetween, and wherein the plurality of first wiring lines is formed of the same material as the wiring line layer and the second wiring line is formed of the same material as the semiconductor layer.

11. The electro-optical device according to claim 1, wherein the electro-optical element is an OLED element in which a plurality of layers, including a light emitting layer, are stacked between an anode and a cathode, and further comprising:
    alignment patterns formed by stacking two or more layers selected from a plurality of layers including the layers composing the OLED element, the anode and cathode.

12. The electro-optical device according to claim 1, wherein the electro-optical element is an OLED element in which a plurality of layers, including a light emitting layer, are stacked between an anode and a cathode, and further comprising:
    first alignment patterns formed by stacking two or more layers selected from a plurality of layers including the layers composing the OLED element, the anode and cathode, and second alignment patterns formed by stacking two or more layers having a combination different from a combination of the layers composing the first alignment patterns.

13. An electronic apparatus including the electro-optical device according to claim 1.

14. A method of checking an electro-optical device including a plurality of unit circuits, each including an electro-optical element and a control circuit for controlling the electro-optical element, wherein, after changing a check signal supply element provided between a check unit circuit selected, as a check object, from the plurality of unit circuits and a check terminal, from a first state where the electro-optical element in the check unit circuit is electrically isolated from the check terminal to a second state where the electro-optical element in the check unit circuit is electrically connected to the check terminal, a check signal for driving the electro-optical element is input to the check terminal, and wherein a change of the state of the electro-optical element when the check signal is input to the check terminal is checked.

15. The method of checking an electro-optical device according to claim 14, wherein the control circuit in each of the plurality of unit circuits has a switching element for switching between electrical conduction and non-conduction between the electro-optical element and the control circuit, and wherein, when the check signal is input to the check terminal, the electro-optical element is electrically isolated from the control circuit by turning off the switching element.

* * * * *